Oct. 1, 1968 W. P. LEAR 3,403,868

MAGNETIC TAPE CARTRIDGE SYSTEM

Original Filed Aug. 31, 1964 2 Sheets-Sheet 1

INVENTOR
WILLIAM P. LEAR,
By Richard A. Marsen
his ATTORNEY

INVENTOR
WILLIAM P. LEAR,
By Richard A. Marsen
his ATTORNEY

United States Patent Office 3,403,868

Patented Oct. 1, 1968

3,403,868

MAGNETIC TAPE CARTRIDGE SYSTEM

William P. Lear, Wichita, Kans., assignor to Lear Jet Industries, Inc., a corporation of Delaware Original application Aug. 31, 1964, Ser. No. 393,083, now Patent No. 3,350,025, dated Oct. 31, 1967. Divided and this application Oct. 11, 1965, Ser. No. 494,645

12 Claims. (Cl. 242—55.19)

ABSTRACT OF THE DISCLOSURE

An endless tape cartridge with an apertured front wall exposing tape portions thereat, and a pressure roller adjacent thereto. A longitudinal side wall of the cartridge is formed with a V-shaped recess to receive a retention detent of the player when the cartridge is inserted in play position. The single detent bears against the inclined forward wall of the recess, to firmly press the pressure roller forwardly against a drive capstan for longitudinal transport of the tape, and simultaneously laterally press the opposite cartridge side wall into stable hold position. A second forward recess establishes an intermediate non-play hold position for the cartridge.

This invention relates to magnetic tape cartridges, and more particularly to novel cartridge construction and configuration for endless tape that is self-contained, sturdy and simple to use. This is a division of my copending Patent No. 3,350,025 filed on Aug. 31, 1964 and assigned to the assignee hereof.

The cartridge of the present invention is effectively and directly handled for insertion-to-play, standby-hold or removal from the player unit. It is provided with a unique notch arrangement that coacts with a retention roller in the player. By using two successive notches, manual positioning of the cartridge determines its operational mode. This permits the use of a slotted opening in the player for the cartridge, and effects its playing directly, without the need for collateral levers or controls. Such player system is shown and described in the copending patent application for "Combination Radio and Magnetic Cartridge Player," Ser. No. 392,212 filed on Aug. 26, 1964, and assigned to the same assignee.

Finger grips are incorporated at the rear section of the cartridge hereof for its operational handling. A recessed region is provided at the back end of the cartridge to protect a contained card or label denoting the title or contents of the tape recordings therein. Further a ramp is made integral with the cartridge forward end to permit the retention roller of the player to readily ride up the corresponding cartridge side to coact with the hold-notches.

These and further features, advantages and objects of this invention will become more apparent from the following description of an exemplary embodiment thereof, illustrated in the drawings, in which.

Figure 1:
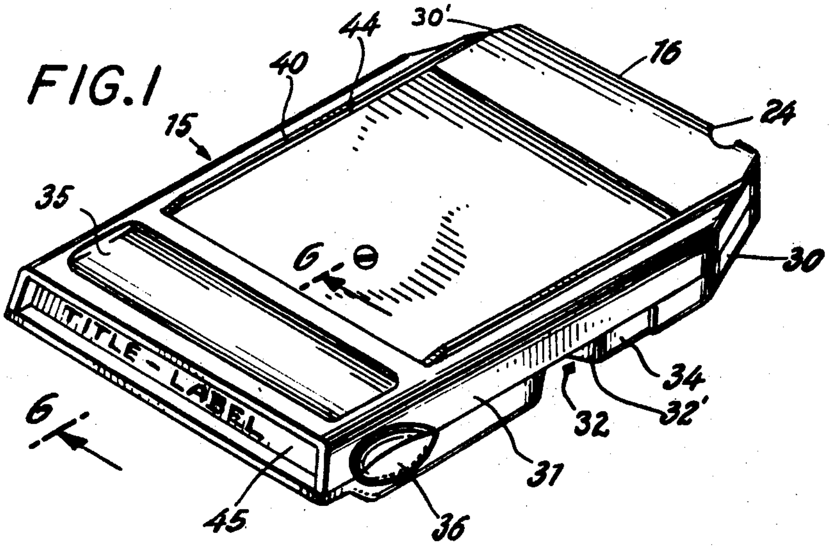
FIG. 1 is a perspective illustration of the exemplary cartridge of the present invention.

The magnetic tape cartridge 15 is basically constructed of rugged molded components and relatively inexpensive for mass marketing. Cartridge 15 is designed as an essentially self-contained unit, with a reel of tape 20 in endless array therein. In use, the cartridge is manually positioned in the player, to effect direct play without auxiliary manipulation. The player system and unit therefor is shown in the aforementioned patent application Ser. No. 392,212. The forward end 16 of the cartridge 15 is inserted into the slotted region or tunnel of the player chassis.

The pinch roller 17 is rotatably mounted in the cartridge 15 on a suitable post or member as shown at 18 therein, to serve as a bearing therefor. Roller 17 is located near a forward corner 30 of the cartridge adjacent a cut-out or opening 24. Pinch roller 17 thus operatively engages drive capstan 19, with the tape loop portion 21 therebetween. The pinch roller bearing mount 18 may be affixed to the base of the cartridge or biased outwardly toward the cut-out 24, as well known in the art and as shown in my aforesaid parent patent application. The forward cartridge end 16 optionally abuts a fixed stop 22 to keep the cartridge 15 "seated" in the play position. The capstan 19 serves as a stop as well, as does the head 23. Besides engagement with the capstan, the tape loop 21 is pressed against the face of the magnetic pick-up head 23. The tape 21 is moved past head 23 at a predetermined uniform velocity, for reproduction of the recordings on the tracks on the tape. The forward cut-out 24 permits the capstan 19 to somewhat enter the cartridge end 16 and coact with the contained roller 17. A spring-pressed pad 25 stably holds tape 21 against the head 23.

The cartridge region within the player contains a side guide 26 opposite the one, indicated by dotted line 27, that contains a retention roller 28. The forward cartridge end 16 has its corner, on the notched side 31, inclined in the form of a ramp 30. The roller 28 is biased inwardly towards the cartridge 15 by leaf spring 29. The ramp 30 engages the roller initially, as indicated schematically at 28', and thereupon moves it outwardly to the cartridge side 31. The ramp 30 permits the cartridge 15 to be moved forward, beyond the initial unengaged position of the retention roller and spring as indicated in dashed lines at 28', 29'. When the cartridge end 16 is thereupon fully 'seated' against the capstan 19, head 23 (and stop 22), the notch 32 in its side 31 is firmly engaged with the roller 28 and the pinch roller 17 is engaged with capstan 19 with an exposed tape portion 21 therebetween (see FIG. 2).

Figure 2:
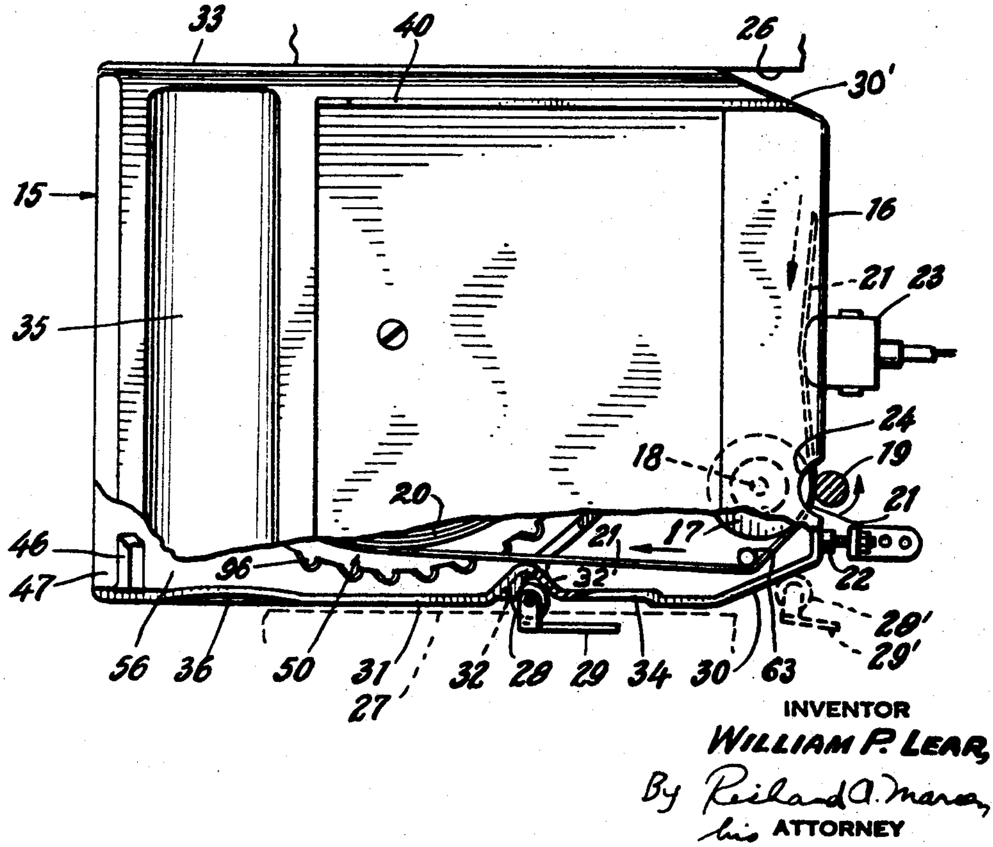
FIG. 2 is a plan view of the cartridge, partly broken-away, and in coaction with the player retention roller.
Figure 3:
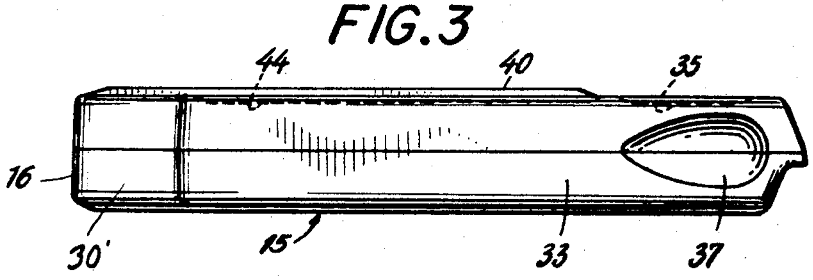
FIG. 3 is an elevational view of the cartridge, as seen from the left side of FIG. 1, opposite the notched side.
Figure 4:
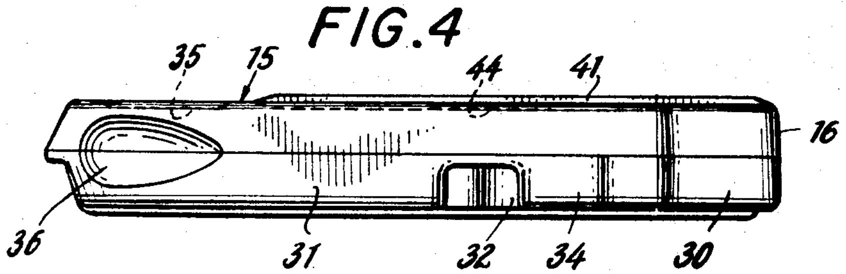
FIG. 4 is an elevational view of the notched side of the cartridge.

The retention roller 28 latches the cartridge 15 in its play mode, pressing its side 33 against the side-guide 26 into stable physical relation. The notch 32 has a forward inclined surface portion 32' against which the roller 28 presses in this play mode. The resultant force components include one in the forwardly direction that maintains the forward cartridge end 16 in this tape play position, firmly against stop 22, head 23, and capstan 19. The inclined notch surface portion 32' develops a second force component in its coaction with the spring pressed retention roller 28, which second force component is lateral, pressing the cartridge stably against the side-guide 26. The preferred form of the recess 32 in longitudinal cartridge side 31 is as a V-notch, as shown in FIGS. 1 and 2, with its apex furthest inwardly. The V-notch 32 extends from the base level to an intermediate level of the cartridge, and has a flat top as shown in FIGS. 1 and 4. A second notch 34 is a shallow indentation in side 31, forward of notch 32. Notch 34 engages retention roller 28 before notch 32 is reached upon cartridge insertion. Such intermediate position of the cartridge 15, held at its notch 34, is its standby-hold mode in the player, as described in the aforesaid copending case.

Spring 29 exerts sufficient force on retention roller 28 to maintain the cartridge 15 firmly and stably in said play position, even over bumps when in mobile use. The ramp 30 facilitates cartridge insertion, as set forth. When the cartridge is pulled out of the player it become disengaged with the roller 28. The front corner opposite ramp 30 is preferably similarly inclined, as shown at 30′. This not only results in a more esthetic cartridge appearance, but also facilitates the insertion of the cartridge into the player as described in the parent application. The cartridge hereof is provided with built-in finger grip areas to aid and insure ready handling in its manual insertion and removal from the player. The grip areas are at the back region of the cartridge.

A top finger grip cavity 35 extends laterally across the upper rear region. Finger cavities 36, 37 are formed in cartridge sides 31 and 33 respectively, near the outer or rear section thereof. As this cartridge section remains exposed, even when inserted in its play mode, one can readily maneuver it into its respective removal, play or hold modes. The exemplary cartridge is 4.0″ wide, 5.5″ long and ⅞″ thick. Its contained tape reel, with eight recorded tracks, driven at 3.75″ per second can provide up to two hours of two-track stereophonic music playing. The cartridge 15 is readily handled with one hand, for direct control, even while driving an automobile. Its use and control is as simple as operating the radio in the automobile.

The cartridge 15 incorporates two parallel longitudinal ridges 40, 41 on its cover, near its sides. The base is grooved at 42, 43 with parallel portions that are arranged to overlap corresponding ridges 40, 41 of another cartridge upon which it is stacked. This prevents their side slippage when stacked. The cover has a slight depression in the region 44 between ridges 40, 41 into which a card or label is pasted that contains a list of the recordings therein. A title label 45 is attached to a recessed panel 46 across the back 47 of the cartridge 15. The panel 46 is integral with the base of the cartridge. The external face of the panel 46 is inclined to better show up the label 45. The visible yet interior position of the label affords it protection from handling.

The cover and base of the cartridge are molded of rugged composition material, with good impact resistance and high heat stability. I prefer to make these external cartridge parts bone white in color. This color reflects radiant rays and thus better preserves the cartridge against mechanical distortion when exposed to sunshine. Snarls in the tape or uneven tape movement are thus avoided when a cartridge is left on a car seat in the sun.

The magnetic tape reel 20 is supported on the disc-base of a spool 50, and surrounds a central hub. The spool is rotatably supported on the base 56 of the cartridge. The spool 50 turns freely above base 56 in response to tape motion. When the pinch roller 17 is driven by capstan 19 (see FIG. 2), the tape loop portion 21 winds about the tane reel 20 as outer convolutions, that are arrayed spirally towards the hub. Such endless tape array in a self-contained cartridge is well known in the art, and is more fully described in the aforesaid patent application.

The exiting tape portion from the central convolution at the hub merges with loop portion 21 that coacts with pinch roller 17, and thereupon rides about post 63 to reenter as the outer convolution on reel 20. The magnetic playback head 23 enters opening 64 at the forward end 16 of the cartridge, and presses tape portion 21 against spring-pressed felt pad 25. Circuit contacts (not shown) enter opening 66, pressing the forward tape portion against felt pad 65. When the capstan 19 operates against the roller 17, with the tape loop portion 21 therebetween, the tape is moved past the head 23 and the contacts.

Figures 5, 6:
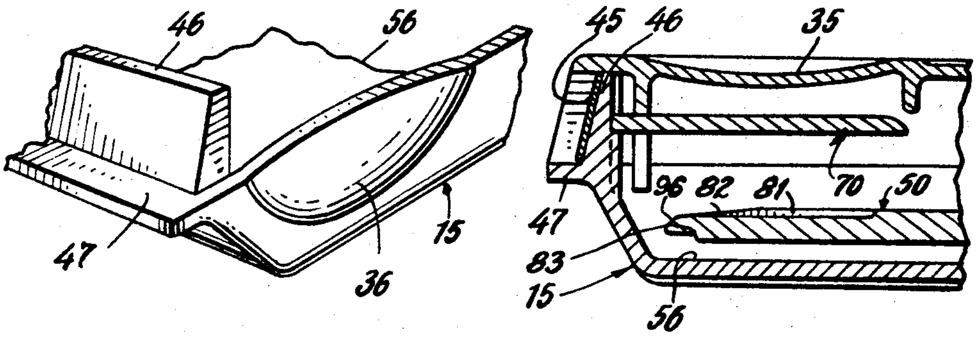
FIG. 5 is an enlarged partial view of a rear corner of the lower cartridge section.
FIG. 6 is a cross-sectional view through the rear section of the cartridge, taken along the line 6—6 of FIG. 1.
Figure 7:
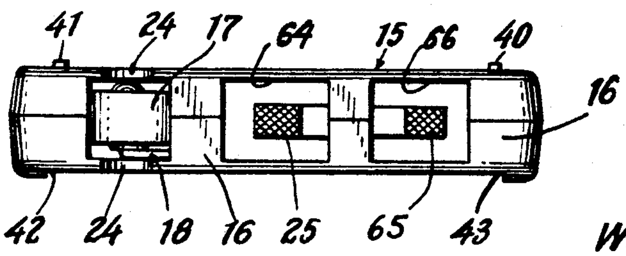
FIG. 7 is an elevational view of the forward end of the cartridge.

A wafer 70 of composition material, is fitted over the reel 20 (see FIG. 6). The wafer insures that the reel convolutions essentially stay "in-line" as a reel, in formation, and flat upon the spool base. The tape reel 20 rests upon a plurality of highly polished radial flat ridges 81 about the base of spool 50, with their edge regions 82 shown sloped downwardly towards the rim 83. A series of small projections 96, 96 are shown about the rim of spool 50.

Although the present invention has been set forth in connection with an exemplary embodiment, it is to be understood that variations and modifications thereof may be made within the broader spirit and scope of the invention, as set forth in the following claims.

I claim:

1. A magnetic tape cartridge adapted for transcription play in a player unit that has a transducer head, a drive capstan, and a single retention element for effectively engaging the cartridge, said cartridge comprising a housing of substantially rectangular form containing a reel of magnetic tape in endless array, said housing being formed with open regions in its front wall for coaction of exposed tape portions with the transducer head and the drive capstan, a pinch member supported in said housing adjacent a longitudinal side wall thereof and near an open frontal region for pressing the tape portion exposed thereat against the drive capstan to transport the magnetic tape across the transducer head, said housing having a recess extending therein from its said longitudinal side wall at a position for engagement with the retention element, said recess being formed with an upstanding wall projecting inwardly from said side wall and at a substantial angle thereto such that surface sections of the upstanding wall are located further from the front wall of the housing than the location of the juncture of the upstanding wall with said side wall, said upstanding wall being arranged to have an intermediate surface section thereof coact with the single retention element to provide a force component forward of the cartridge to directly press said pinch member and the contiguous tape portion against the drive capstan to firmly transport the tape and to simultaneously provide an effective force component laterally of the cartridge for stably positioning and holding it in the play mode.

2. A magnetic tape cartridge as claimed in claim 1, in which the said surface sections of the upstanding recess wall extend essentially as a plane wall perpendicular to the base of the housing, whereby a number of intermediate surface sections along the upstanding wall effectively provide said simultaneous forward and lateral force components for the cartridge when in individual coaction with the single retention element.

3. A magnetic tape cartridge as claimed in claim 1, in which the volume of its said recess is substantially greater than that of the retention element engageable therewith, and said upstanding wall is substantially wider than the width of the retention element coactable therewith, whereby the coaction of the single retention element with an intermediate surface section thereof is individual to provide said simultaneous forward and lateral force components for the transcribing and stable holding of the cartridge in the play mode.

4. A magnetic tape cartridge as claimed in claim 1, in which the corner of its front wall at the side of said longitudinal side wall has a ramp configuration to displace the retention element upon cartridge insertion in the player unit and guide it to said side wall for engagement with the recess therein.

5. A magnetic tape cartridge as claimed in claim 4, in which the said ramp configuration includes a substantially plane surface inclined across said corner extending from the front wall to said side wall.

6. A magnetic tape cartridge as claimed in claim 1, further including a second recess with a wall portion extending from said cartridge side wall and adjacent the first said recess, for independent coaction with the retention element to hold the cartridge in stable out-of-tape-play relation in the player unit.

7. A magnetic tape cartridge as claimed in claim 6, in which said second recess is positioned forward of the first said recess nearer to the front wall of the cartridge and is shallower than said first recess.

8. A magnetic tape cartridge as claimed in claim 5, further including a second recess with a wall portion extending from said cartridge side wall and adjacent the first said recess, for independent coaction with the retention element to hold the cartridge in stable out-of-tape-play relation in the player unit and in which said second recess is positioned forward of the first said recess nearer to the front wall of the cartridge and is shallower than said first recess.

9. A magnetic tape cartridge as claimed in claim 1, in which said recess is in V-notch form projecting inwardly from said longitudinal side wall with its said upstanding wall being the forward plane wall of the V-notch and extending to the apex thereof, said V-notch extending from an intermediate level of the cartridge to its bottom level.

10. A magnetic tape cartridge as claimed in claim 4, in which said recess is in V-notch form projecting inwardly from said longitudinal side wall with its said upstanding wall being the forward plane wall of the V-notch and extending to the apex thereof, said V-notch extending from an intermediate level of the cartridge to its bottom level, and a top wall extending over said V-notch at its said intermediate level in the cartridge.

11. A magnetic tape cartridge as claimed in claim 1, in which both longitudinal side walls of said housing extend substantially its whole length for directly orienting the cartridge longitudinally in a cartridge receiving opening of the player unit for predetermined play coaction of its exposed tape portions with the transducer head and drive capstan, the said recess in the first said longitudinal side wall extending inwardly therefrom in V-notch form at an intermediate location therealong as the sole retention-to-play recess of the cartridge, whereby the detent coaction of the retention element with said recess solely provides the said forward and lateral force components for the cartridge for stably holding it in-play position in the player with its second longitudinal side wall firmly pressed against the corresponding side of the player.

12. A magnetic tape cartridge-player system including a player unit, a cartridge adapted for transcription play in said unit, said player unit having a cartridge receiving opening and a longitudinal side guide therewith, and containing a transducer head, a drive capstan, and a single retention element positioned with respect to said cartridge receiving opening for effectively engaging said cartridge and operating it in the play mode; said cartridge comprising a housing of substantially rectangular form with a reel therein of magnetic tape in endless array, said housing being formed with open regions in its front wall for play coaction of exposed tape portions with said transducer head and drive capstan, a pinch member supported in said housing adjacent a first longitudinal side wall thereof and near an open frontal region for pressing tape portions thereat against said drive capstan to transport the magentic tape across said transducer head; said transducer head and capstan being positioned at the interior of said cartridge receiving opening in the player for coaction with the magnetic tape when said cartridge is inserted and held therein, and said retention element being predeterminedly mounted at an intermediate position along that side of said cartridge receiving opening that is nearer said capstan and being spring biased into said opening for firmly engaging said cartridge for play; said longitudinal side guide being mounted in the player opposite said retention element; said housing having a recess extending into its said first longitudinal side wall at such intermediate location as to engage with said single retention element upon cartridge insertion into said opening, said recess being formed with an upstanding wall projecting at a substantial angle to said first housing side wall such that surface sections of the upstanding wall are located further from the front wall of the housing than the location of the juncture of the upstanding wall with its said first side wall, said upstanding wall being arranged to have an intermediate surface section thereof coact with said retention element to provide the sole forward force component on the cartridge to directly press its said pinch member and the contiguous tape portions against said drive capstan to firmly transport the magnetic tape and to simultaneously provide the sole lateral force component on the cartridge of substantial amount to maintain its second longitudinal side wall effectively pressed against said side guide for stably positioning and holding said cartridge in the play mode in the player.

References Cited

UNITED STATES PATENTS

| | | | |
|---|---|---|---|
| 2,804,508 | 8/1957 | Mastling et al. | |
| 3,311,316 | 3/1967 | Williams. | |
| 2,778,637 | 1/1957 | Eash ------------- | 242—55.19 |
| 3,161,362 | 12/1964 | Smith ------------ | 242—55.19 |

FOREIGN PATENTS

| | | |
|---|---|---|
| 1,258,149 | 2/1961 | France. |

BILLY S. TAYLOR, *Primary Examiner.*

Disclaimer 3,403,868.—*William P. Lear*, Wichita, Kans. MAGNETIC TAPE CARTRIDGE SYSTEM. Patent dated Oct. 1, 1968. Disclaimer filed Nov. 24, 1971, by the assignee, *Gates Learjet Corporation.*

Hereby disclaims the portion of the term of the patent subsequent to Oct. 31, 1984.

[*Official Gazette January 25, 1972.*]